Mar. 27, 1923.

E. W. ZEH

POWER PRESS

Filed Oct. 10, 1919

1,449,849

3 sheets sheet 1

INVENTOR:
Edmund W. Zeh,
BY
Russell M. Everett,
ATTORNEY.

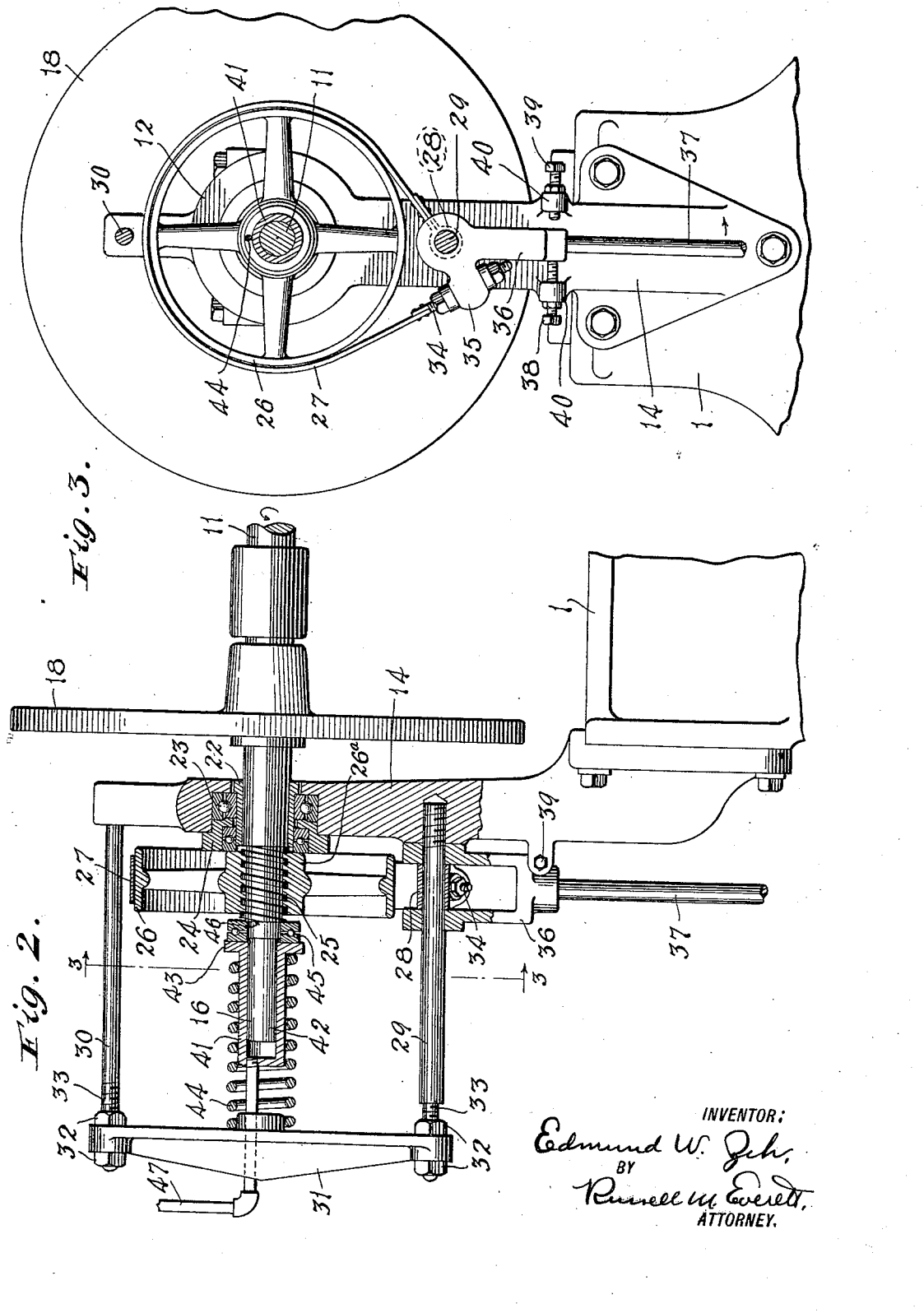

Mar. 27, 1923.
E. W. ZEH
1,449,849
POWER PRESS
Filed Oct. 10, 1919
3 sheets sheet 3
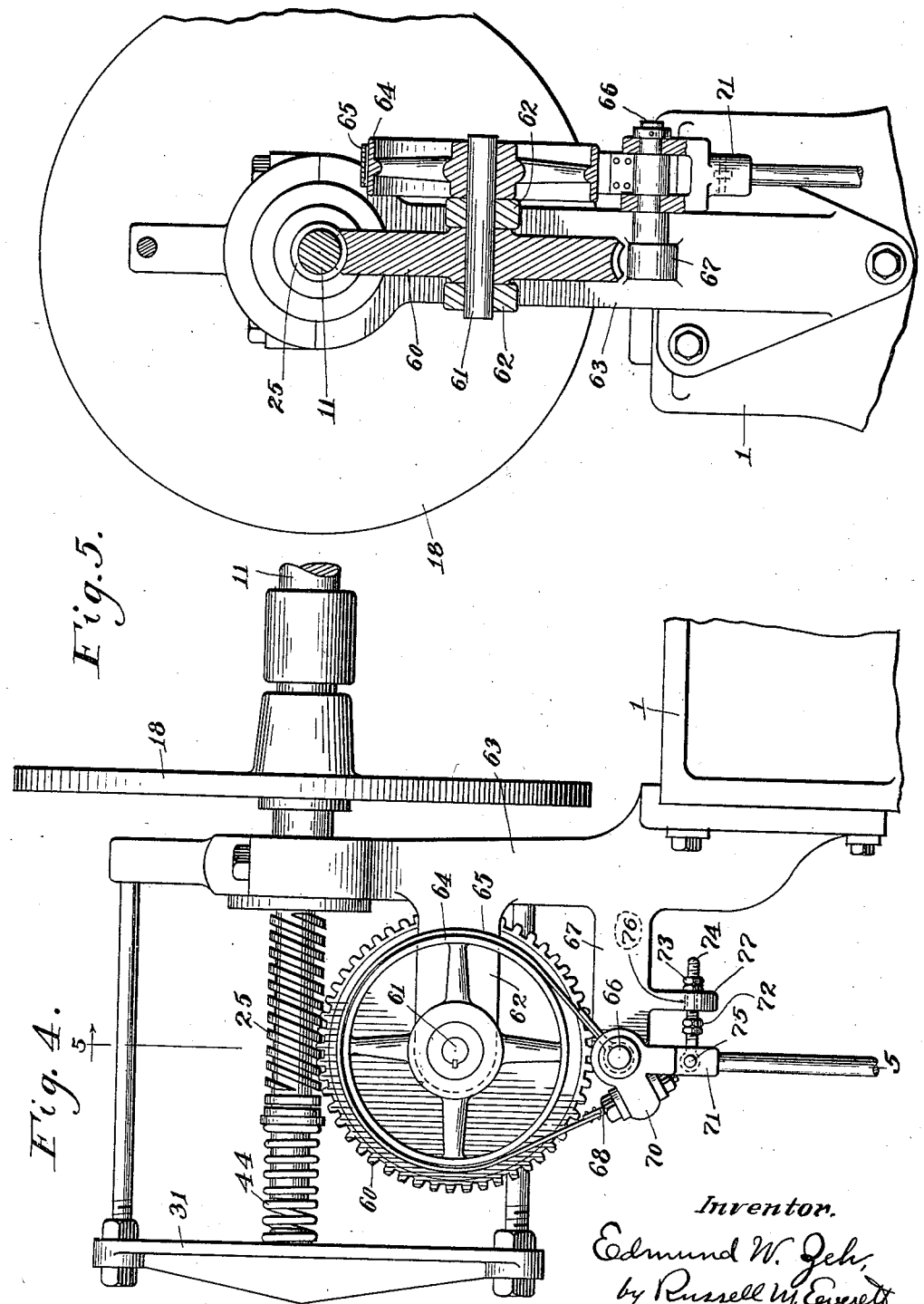
Inventor.
Edmund W. Zeh,
by Russell M. Everett,
Attorney.

Patented Mar. 27, 1923.

1,449,849

UNITED STATES PATENT OFFICE.

EDMUND W. ZEH, OF NEWARK, NEW JERSEY.

POWER PRESS.

Application filed October 10, 1919. Serial No. 329,755.

*To all whom it may concern:*

Be it known that I, EDMUND W. ZEH, a citizen of the United States, and a resident of Newark, in the county of Essex and State of New Jersey, have invented new and useful Improvements in Power Presses, of which the following is a specification.

This invention relates in general to that class of power presses in which a head for carrying one die is moved toward and away from a bed supporting a fixed die by a screw which is alternately rotated in opposite directions by alternate engagement of a pair of friction disks with opposite sides of a friction wheel carried by the screw, the invention being more particularly directed to improved means for causing alternate engagement of the friction drive disks with the friction wheel.

The objects of the invention are to provide means for moving one of the friction disks into engagement with the friction wheel against the action of a spring, by power derived from the source of power rotating the disks to cause the screw to move toward the fixed die, the spring forcing the said friction disk away from the friction wheel and the other friction disk simultaneously into engagement with the friction wheel to withdraw the screw from the fixed die; to provide means rotated by but movable relatively to the friction disk shaft, the retardation of which means causes the friction disk shaft to move longitudinally; to secure simple and easily operated means for retarding the said member rotated by the friction disk shaft; to provide means for regulating the amount of retardation of said member so as to secure a uniform pressure of the friction disk upon the friction wheel; to utilize a screw or worm upon the friction disk shaft which engages with a brake pulley so that retardation of the brake pulley causes a longitudinal movement of the friction disk shaft in one direction against the action of a spring which returns the shaft upon release of the brake pulley; to provide automatic means actuated by the return of the screw to move the friction disks into neutral position out of engagement with the friction wheel, so as to stop rotation of the screw; and to obtain other objects and advantages as may be brought out in the following description.

Referring to the accompanying drawings, in which like numerals of reference indicate the same parts throughout the several views.

Figure 2 is an enlarged fragmentary elevation of the left-hand side of the upper portion of the press as viewed from Fig. 1, portions thereof being shown in section;

Figure 3 is a vertical sectional view of the press on the line 3—3 of Fig. 2, portions being shown in side elevation;

Figure 4 is a view similar to Fig. 2 showing a modified form of the invention, and Figure 5 is a vertical sectional view on the line 5—5, of Fig. 4.

Figure 1:
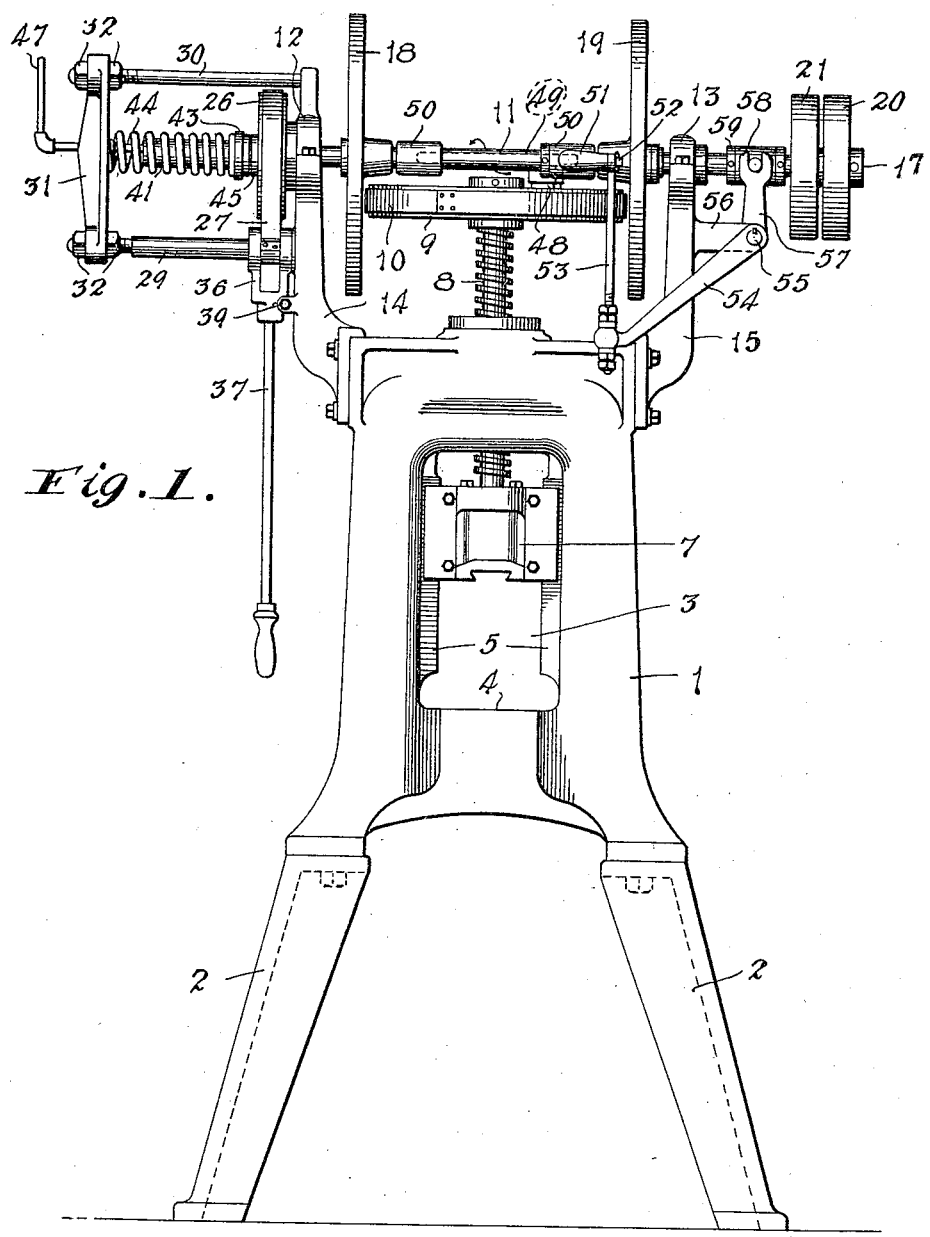
Figure 1 is a front elevation of a power press embodying my invention.

Specifically describing the embodiment of the invention illustrated by Figures 1 to 3, inclusive, the numeral 1 designates the frame of the press which is mounted on legs 2 in a vertical position and at a convenient height for the operator. The frame 1 is provided with an elongated vertically disposed opening 3 extending transversely through the frame at its longitudinal center, said opening being formed at the lower end thereof with a bed 4 adapted to receive a fixed die (not shown). The sides of the opening 3 are provided with vertical guides 5 upon and between which is mounted a vertically slidable head 7 adapted to carry another die (not shown) to cooperate with the fixed die. This head 7 is carried by the lower end of a vertical screw 8 which has a suitable swivel connection with the head and extends upwardly through the top of the frame 1, the upper end thereof being provided with a horizontally disposed wheel 9 having a friction surface 10 on its periphery. It is obvious, therefore, that rotation of the screw alternately in opposite directions will cause the head 7 to be moved up and down on the guides 5.

Arranged above the friction wheel 9 and diametrically thereof is a horizontally disposed drive shaft 11 journalled in bearings 12 and 13 at the upper ends of upstanding brackets 14 and 15 secured to opposite sides of the frame 1. The bearings 12 and 13 are preferably anti-friction, and the shaft 11 is both rotatable and slidable therein, the ends of the shaft projecting outwardly beyond the bearings, as indicated at 16 and 17. Fixed on the shaft 11 at diametrically opposite sides of the friction wheel 9 is a pair of friction disks 18 and 19 adapted to alternately engage the friction surface 10 of the wheel 9 to rotate the screw 8. One end of the shaft 11, in the present instance the end 17, is provided with fast and loose pulleys 20 and 21 respectively, which are adapted to receive a drive belt (not shown) to rotate the shaft 11. Assuming the shaft 11 to be rotating in the direction of the arrows on Figures 1 and 3, it will be obvious that as the friction disk 19 engages the wheel 9 the head 7 will be forced downwardly, while engagement of the disk 18 with the wheel 9 will move the head 7 upwardly. To accomplish the alternate engagement of the friction disks 18 and 19 with the friction wheel 9 the shaft 11 is slidable in its bearings. Thus, the bearings 12 and 13 preferably include bushings 22 through which the shaft slides, said bushings being mounted in ball bearings 23 held in place by suitable nuts 24.

Means are provided for forcing the friction disk 19 into engagement with the friction wheel 9 to cause downward movement of the head 7 by power derived from the source of driving power for the press. For this purpose the projecting end 16 of the shaft 11 is provided with a worm or screw thread 25 having a long pitch upon which is fitted a brake pulley 26. It will thus be seen that the brake pulley 26 normally rotates with the shaft 11, but is also capable of relative movement thereon. Therefore, if rotation of the pulley 26 is retarded or stopped, the hub 26ª thereof acts as a nut on the thread 25 so as to cause the shaft 11 to be moved longitudinally in the hub 26ª. The thread 25 being in the proper direction, the friction disk 19 will thus be drawn into contact with the friction wheel 9. A brake-band 27 extends around the rim of the brake pulley 26 and has one end thereof connected at 28 to a laterally extending spacing rod 29 secured in the bracket 14, said spacing rod serving with a similar rod 30 arranged above to support a cross-head 31 at their outer ends which is adjustable by the nuts 32 on the threaded ends 33 of the rods. The opposite end of the brake-band 27 is fastened to a bolt 34 adjustable in an arm 35 projecting from a brake lever head 36 which is also pivotally mounted on the rod 29. The lever head 36 is provided with a suitable handle 37 to be grasped by the operator, and as the lever 36 is swung in the direction of the arrow on Figure 3, the brake band will be tightened upon the brake-pulley. Stop screws 38 and 39 are mounted in bracket ears 40 projecting from the bracket 14, to limit the swinging movement of the lever 36, so as to regulate the degree of pressure of the brake band on the pulley 26.

After the shaft 11 has been moved by the screw 25 and the brake pulley 26 to force engagement of the friction disk 19 with the wheel 9 to lower the head 7, it is necessary to break the contact of said disk and wheel and force engagement of the other friction disk 18 and friction wheel 9 to raise the head. A cap sleeve 41 is thus fitted over the reduced end 42 of the shaft 11 and provided with a flange 43, between which and the cross-head 31 is interposed a strong coil spring 44, which forces the flange into engagement with a thrust ball-bearing 45 engaging a shoulder 46 at the outer end of the screw 25. Thus, when the brake band is released from the brake pulley 26 the spring forces the shaft 11 to unscrew itself out of the hub 26ª of the brake pulley so as to cause engagement of the disk 18 and wheel 9. A second thrust bearing is interposed between the hub 26ª of the brake pulley and the nut 24 to prevent binding of the hub on the nut and allowing free rotation of the pulley. An oil duct 47 leads into the cap sleeve 41 to lubricate the bearing of the shaft therein.

Upward movement of the screw 8 being thus started it is necessary to throw both disks 18, 19 out of engagement with the wheel 9 to stop the screw 8. For this purpose a brake shoe 48 is mounted upon a bracket 49 projecting rearwardly from sleeves 50 loose on the shaft 11, one of said sleeves being provided on the front thereof with a laterally projecting arm 51 having a loose connection 52 with the upper end of a vertical link 53 connected at its lower end to one end of a shaft shifting lever 54. This lever 54 has its other end fixed to a stub shaft 55 journaled in a bracket 56 projecting from the bracket 15, which shaft has also fixed thereto a forked lever 57 engaging trunnions on the opposite sides of a sleeve 58 loose on the shaft 11 and fixed against sliding by set collars 59. With this construction, as the screw 8 rises and the wheel 9 engages the brake shoe 48 the arm 51, link 53 and lower end of the shaft shifting lever 54 are forced downwardly, which moves the forked lever 57 to slide the shaft 11 against the action of the spring 44 to throw both disks 18, 19 into neutral inoperative position. The brake shoe bearing on the top of the wheel 9 causes it to come to rest.

From the above description, assuming that the shaft 11 is being driven in the direction of the arrows on Figures 1 and 2, and the machine in idle position, to start the press, the operator pulls the brake lever 36 in the direction of the arrow on Figure 3, which tightens the brake band on the pulley 26. The head 7 is thus forced downwardly by the screw 8 and as it reaches its downward limit, which is determined by the height of the fixed die, the operator releases the brake lever. The spring 44 then forces the disk 18 into engagement with the wheel 9 to raise the head 7, and the rising of the head 7 is stopped by engagement of the wheel 9 with the brake-shoe 48, which throws both the disks 18 and 19 into neutral position. A uniform pressure of the brake band 27 on the brake pulley 26 is insured by the stop screws 38, 39, so that the operator can not pull hard enough on the brake lever 36 to completely stop the brake pulley and consequently stop the press or break some part thereof. The pressure of the brake band on the pulley 26 is merely sufficient to retard it enough to allow relatively fast rotation of the shaft 11 to cause the thread 25 to screw into the hub 26$^a$. Only a very slight pull on the brake lever is necessary, which can be easily accomplished by one hand of the operator.

A modification of the invention is shown by Figures 4 and 5 of the drawings, in which the worm or thread 25 on the drive shaft 11 meshes with a worm wheel 60 fixed to a short shaft 61 rotatable in bracket arms 62 projecting from the bracket 63 supporting the shaft. At the outer end of the shaft 61 is fixed a brake pulley 64 surrounded by a brake band 65, one end of which is connected to a stub shaft 66 projecting laterally from a bracket arm 67 on the bracket 63, the opposite end of the brake band being connected to an adjustable bolt 68 in an arm 70 projecting from a brake lever 71, also pivotally mounted on the stub shaft 66. When the brake pulley is retarded by swinging the lever 71 toward the machine, the worm wheel 60 is also retarded so that the drive shaft 11 is moved longitudinally by the worm 25 engaging the worm wheel, the operation being substantially the same as described in connection with Figures 1 to 3. The swinging of the brake lever is limited and regulated by set nuts 72, 73 on a screw rod 74 pivoted at 75 to the brake lever and sliding through an opening 76 in a depending lug 77 on the bracket arm 67. The construction and operation is otherwise identical with that above described, and it will be obvious that either of the constructions shown by Figures 1 to 3 inclusive, or Figures 4 and 5, accomplishes the same result. It will be also obvious that the brake levers 36 and 71 can be adapted to be operated by the foot of the operator, thus leaving both hands free to handle the work.

Various detail modifications and changes can be made in the construction of my machine without departing from the spirit or scope of the invention, and I do not wish to be understood as limiting myself except as required by the following claims when construed in the light of the prior art.

Having thus described the invention, what I claim is:

1. In a power press, the combination with a movable head, means for moving said head, and a slidable drive shaft adapted to alternately connect with and disconnect from said head-moving means as said shaft is slid, of a member normally rotatable with said drive shaft but capable of relative rotary movement with respect thereto to slide the shaft, and means for causing relative rotary movement of said member with respect to said drive shaft.

2. In a power press, the combination with a movable head, means for moving said head, and a slidable drive shaft adapted to alternately connect with and disconnect from said head-moving means as said shaft is slid, of a member normally rotatable with said drive shaft but capable of relative rotary movement with respect thereto to slide the shaft, and means for retarding said member with respect to said drive shaft.

3. In a power press, the combination with a movable head, and means for moving said head, of a slidable drive shaft provided with drive means for said head-moving means adapted to alternately connect with and disconnect from said head-moving means as said shaft is slid, a member upon said drive shaft and capable of relative movement thereto to slide the drive shaft, and means for causing said relative movement of said member with respect to the drive shaft.

4. In a power press, the combination with a movable head, and means for moving it, of a longitudinally slidable drive shaft provided with drive means adapted to be alternately connected with and disconnected from said head-moving means, a member mounted upon said drive shaft and capable of relative movement thereto to slide the drive shaft and alternately connect and disconnect said drive means and head-moving means, and means for causing said relative movement of said drive shaft and member.

5. In a power press, the combination with a movable head, and means for moving it, of a longitudinally slidable drive shaft having a screw thread and provided with drive means adapted to be alternately connected with and disconnected from said head-moving means, a correspondingly threaded member mounted on said screw thread and capable of movement relatively to said drive shaft, and means for causing said relative movement of the drive shaft and said member to slide the shaft to alternately connect and disconnect said drive means and head-moving means.

6. In a power press, the combination with a movable head, and means for moving it, of a longitudinally slidable drive shaft having a screw thread and provided with drive means adapted to be alternately connected with and disconnected from said head-moving means, a brake pulley mounted on said thread and having a correspondingly threaded hub, said brake pulley being capable of moving relatively to said drive shaft, a brake band on said pulley for causing said relative movement of the drive shaft and the brake pulley to slide the shaft to connect said drive means and said head-moving means, and means for sliding the shaft in the opposite direction to disconnect said drive means and said head-moving means.

7. In a power press, the combination with a movable head, means for moving it, and drive means for said head-moving means adapted to be alternately connected with and disconnected from said head-moving means, of a member normally movable with but capable of movement relatively to said drive means, means for causing said relative movement of the drive means and said member to connect said drive means and head-moving means, and a spring for causing relative movement of said member and drive means to disconnect said drive means and head-moving means.

8. In a power press, the combination with a movable head, and means for moving said head, of a slidable drive shaft provided with drive means adapted to be alternately connected with and disconnected from said head-moving means, a member upon said drive shaft capable of relative movement thereto to slide the drive shaft to connect said drive means with the head-moving means, means for causing said relative movement of said member and drive shaft, and a spring for sliding the drive shaft in the opposite direction to disconnect said drive means and head-moving means.

9. In a power press, the combination with a movable head, and means for moving said head, of a slidable drive shaft having a screw thread and provided with drive means adapted to be alternately connected with and disconnected from said head-moving means, a correspondingly threaded member mounted on said screw thread and capable of movement relatively to said drive shaft, means for causing said relative movement of the drive shaft and said member to slide the shaft to connect said drive means and head-moving means, and a spring for sliding the shaft in the opposite direction to disconnect said drive means and head-moving means.

10. In a press, the combination of a frame, a screw mounted in said frame, a head on one end of said screw adapted to slide in said frame, a friction wheel on the other end of said screw, drive disks at opposite edges of said friction wheel, a slidable shaft for said drive disks and provided with a screw thread thereon, a correspondingly threaded member mounted on said thread and normally rotating with said shaft, and means for retarding said member to slide the shaft to engage one of said friction disks with the friction wheel to move the beforementioned head.

11. In a press, the combination of a frame, a screw mounted in said frame, a head on one end of said screw adapted to slide in said frame, a friction wheel on the other end of said screw, drive disks at opposite edges of said friction wheel, a slidable shaft for said drive disks and provided with a screw thread thereon, a correspondingly threaded member mounted on said thread and normally rotating with said shaft, means for retarding said member to slide the shaft to engage one of said friction disks with the friction wheel to move the beforementioned head in one direction, and a spring adapted to be tensioned by said sliding of the shaft and return it to engage the other friction disk with the friction wheel to move the head in the other direction.

12. In a press, the combination of a frame, a screw mounted in said frame, a head on one end of said screw adapted to slide in said frame, a friction wheel on the other end of said screw, drive disks at opposite edges of said friction wheel, a slidable shaft for said drive disks and provided with a screw thread thereon, a correspondingly threaded member mounted on said thread and normally rotating with said shaft, means for retarding said member to cause the screw thread of said shaft to move in said member to slide the shaft and cause contact of one friction disk with the friction wheel, and spring means for sliding said shaft in the opposite direction to cause contact of the other of said friction disks with said friction wheel.

13. In a press, the combination of a frame, a screw mounted in said frame, a head on one end of said screw adapted to slide in said frame, a friction wheel on the other end of said screw, drive disks at opposite edges of said friction wheel, a slidable shaft for said drive disks and provided with a screw thread thereon, a worm wheel journaled on the frame and meshing with said screw thread to be rotated by said drive shaft, and means for retarding the worm wheel to slide the shaft to engage one of said friction disks with the friction wheel to move the beforementioned head.

EDMUND W. ZEH.